March 31, 1970  E. A. GASSIES  3,503,264
DEVICE FOR MEASURING DIFFERENTIAL PRESSURE OF LIQUID OR GASEOUS
FLUIDS, PARTICULARLY VERY SMALL PRESSURE DIFFERENCES, AS
WELL AS APPLICATIONS OF THIS DEVICE
Filed Aug. 25, 1967
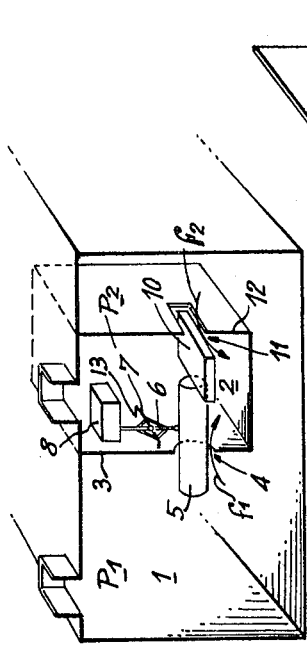
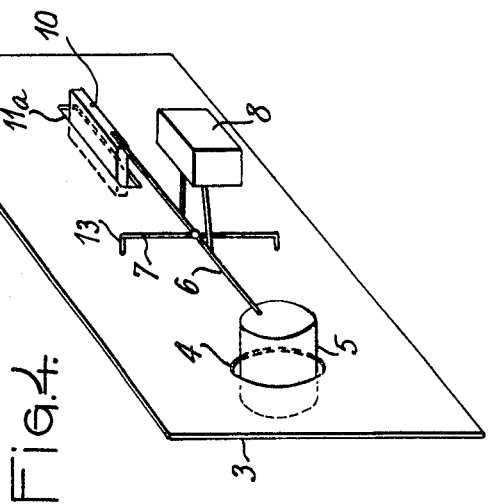
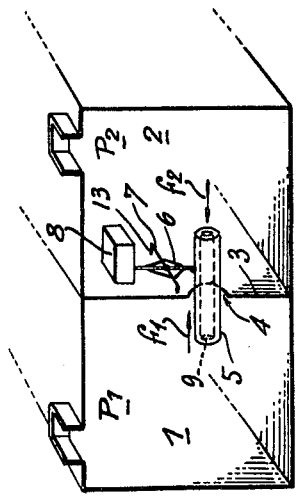
INVENTOR
Edmond Auguste Gassies
BY: Pierce, Scheffler + Parker
ATTORNEYS

United States Patent Office 3,503,264
Patented Mar. 31, 1970

3,503,264
DEVICE FOR MEASURING DIFFERENTIAL PRESSURE OF LIQUID OR GASEOUS FLUIDS, PARTICULARLY VERY SMALL PRESSURE DIFFERENCES, AS WELL AS APPLICATIONS OF THIS DEVICE
Edmond Auguste Gassies, Montrouge, France, assignor to Compagnie des Compteurs, Paris, France, a French company
Filed Aug. 25, 1967, Ser. No. 663,314
Claims priority, application France, Sept. 13, 1966, 76,135
Int. Cl. G01l 7/16, 7/00
U.S. Cl. 73—419
5 Claims

ABSTRACT OF THE DISCLOSURE

Device for measuring the difference of pressure between two pressure sources. Two embodiments use servo-equilibrating devices to balance action against pistons and other bodies placed in apertures in walls situated between chambers which are in communication with the pressure sources. One other embodiment uses a flat member over an aperture to sense pressure differential and again a servo balances motion tendencies of the flat member away from the aperture. The force applied by the various servo devices are indicative of the pressure difference.

---

The present invention has for its object a device for measuring differential pressures of liquid or gaseous fluids, particularly very small pressure differences, as well as applications of this device.

It is known that conventional instruments become inaccurate when the differences of pressure to be measured are small. The invention has for its object to obviate this disadvantage by employing power micro-scale movable equipment, supported by spindles or supported by suspension wires having a negligible twisting torque.

The device according to the invention comprises two chambers respectively fed by the fluids whose pressures are to be compared, a partition wall dividing said two chambers and provided with an opening allowing a communication between said chambers, movable sealing or closure means disposed in said opening, and supported by means having a low twisting torque, said movable means being connected to a servo-device which produces a reactive force to equilibrate the force applied to the sealing means by the pressure differences of the fluids.

Other characteristics of the invention will be apparent from the following description with reference to the accompanying drawing which shows illustrative and by no means limitative embodiment of the present invention and in which:

FIGURE 1 is a diagrammatic perspective view of a device according to the invention, FIGURE 2 is a diagrammatic perspective view of a modification thereof, FIGURE 3 is a diagrammatic perspective view of another modification, and FIGURE 4 is a perspective view of still another modification.

In FIG. 1, are shown the chambers 1 and 2 into which are respectively brought the fluid at the pressure $P_1$ and the fluid at the pressure $P_2$. Said chambers are divided by an inner wall 3 provided with an opening 4. Sealing or closure means constituted by a piston 5 penetrates with some play into the opening 4. The movable assembly of the device according to the invention is constituted by a rod 6 to which are fastened the piston 5 and the movable part of a servo-device 8 mounted on the inner wall 3, said servo-device being of the power-scale type. The movable assembly is suspended by way of a wire 7 mounted on the inner wall 3 by means of a link 13 and whose twisting torque is negligible. The cross-section S of the piston 5 is submitted to a force $F=(P_1-P_2) S$. This force exerts a torque $C=(P_1-P_2)$ S.L., L being the distance from the center of the section S of the piston to the oscillating axis or wire 7 of the movable assembly. When the pressures $P_1$ and $P_2$ are both equal, the force F is nul and the movable assembly hereinbefore defined is in a neutral or rest position and no signal is sensed by the servo device 8 to act on the movable assembly. If pressures $P_1$ and $P_2$ become different, a torque C is produced on the assembly, and said torque is sensed by the servo-device 8 which acts on the assembly tending to push it to the rest position and balance the torque C.

The piston 5 passes through the inner wall 3 with a minimum play suitable with structure tolerance so that leakage may be reduced as much as possible.

However, in the case of the drawing, where $P_1$ is higher than $P_2$, there exists a force $f_1$ pushing piston 5 from left to right due to the fluid leakage between said piston and the inner wall 3 and because of the viscosity of the fluid. To compensate for the effect due to said leakage which will tend to produce a parasitic torque, a channel 9 is drilled from one end to the other in the body of piston 5 so as to create a force $f_2$ in reaction to the force $f_1$. By a correct dimensioning of channel 9, the output flow through said channel from left to right is such that a jet action force $f_2$ is created substantially equal to the opposite force $f_1$.

The servo-device 8 of the power scale type need not be described in detail, as it comprises known means for sensing the displacement of the piston 5 and for creating a current and includes measuring means for the detected current, and a motor of an electro-magnetic, electro-dynamic of ferromagnetic type supplying the reactive force. When the motor is of an electromagnetic type, the servo-current provided by an amplifier is proportional to the torque $C=(P_1-P_2)$ S.L. described above and thus to the difference of pressures, and when the motor is of an electro-dynamic type, the servo-current is proportional to the square root of the torque C and to the square root of the difference of pressures, the servo-current may be measured by any suitable instrument such as an amperemeter.

FIGURE 2 shows a modification of the sealing or closure means which in this example is constituted by a flat member or blade 5a facing the inner wall 3 and whose surface is bigger than the opening 4. The blade 5a fixed onto the rod 6 is pushed against the wall 3 in front of said opening 4 under the action of the servo-device 8.

In FIGURE 3, there is shown a piston 5 whose end which is inside the chamber 2 bears a blade 10 for example of a rectangular cross-section. The cross-sectional area of the blade 10 is plainly smaller than that of piston 5 but its perimeter is substantially equal to that of said piston. The blade 10 passes with some play into an opening 11 in the wall 12 integral with the inner wall 3, said wall 12 delimiting with the inner wall 3, chambers 1 and 2. It is thus possible to compensate the dynamic effects due to the leakage occurring between the piston 5 and the edge of the opening 4, by a reverse action due to the leakage occurring between the blade 10 and the edges of the opening 11. This is made by a correct dimensioning of both the piston and the blade so that the leakage surfaces between the piston and the partition wall 3 and between the blade 10 and the wall 12 are substantially equal.

FIGURE 4 is a modification of FIGURE 3, in which the piston 5 and the blade 10 are mounted on the rod 6, and are fixed on opposed ends of the suspension wire 7.

As in the other embodiments the wire 7 is fixed to the inner wall by means of links 13. The blade 10 is of an analogous shape to that described above and penetrates into an opening 11a provided in the inner wall 3. The moveable part of the servo-device 8 ensures the return of the rod 6 to its neutral position.

The device according to the invention can function as a flow-rate meter when it is connected for example on both sides of a measuring diaphragm. It can also, in combination with a densimeter of a densimetric-scale type, function as a mass flow measurer, the two apparatuses must then be connected to a device computing the product flow-rate density and a meter which measures proportionality to the integrated mass flow rate. The device can also operate as a detector of zero. In this latter case, the rate flow between the chambers 1 and 2 is cancelled.

Although we have described and represented some forms of the invention, it is obvious that we do not want to be limited to those particular forms which were given only by way of example. Details of embodiments may be modified in various ways without departing from the spirit of the invention, such as by modifying the shapes and relative sizes of the parts as well as by substituting equivalent technical means. In particular the blade 10 may have a circular cross-section or be tubular and split along its length so as to penetrate into an opening of corresponding section provided in the inner wall 3.

The device is usable with various fluids, liquid or gas or with steam.

I claim:

1. Device for comparing differential pressures of two fluids comprising two chambers for receiving the fluids whose pressures are to be compared, a wall between said chambers, said wall being provided with at least one opening therein for establishing communication between said chambers, means disposed so as to substantially close said at least one opening, means having a low twisting torque for supporting said closure means in movable relation to said at least one opening in response to the difference in pressure of said fluids, a servo device connected to said movable closure means and responsive to the movement thereof for applying a reactive force to move the closure means to a neutral position and means for measuring said force.

2. A device as claimed in claim 1 wherein the movable closure means comprises a piston member extending thru the opening in said wall.

3. A device as claimed in claim 2 wherein the wall between the chambers is provided with a second opening and further comprising a closure member movable with said piston member and disposed within said second opening, said closure member having a cross sectional area less than the cross sectional area of said piston member and having a perimeter substantially equal to the perimeter of said piston.

4. A device as claimed in claim 3 wherein the piston member and closure member are supported on opposed sides of said supporting means and the openings for receiving said piston member and said closure member are disposed in the same plane.

5. A device as claimed in claim 1 wherein the movable closure means comprises a flat closure member disposed on one side of said opening, the surface of said flat member being larger than said opening.

References Cited

FOREIGN PATENTS 1,187,479   3/1959   France.

LOUIS R. PRINCE, Primary Examiner

DENIS E. CORR, Assistant Examiner

U.S. Cl. X.R.

73—388, 406